(12) United States Patent
Nakata

(10) Patent No.: US 10,841,641 B2
(45) Date of Patent: Nov. 17, 2020

(54) PROGRAM INFORMATION DISPLAY TERMINAL DEVICE

(71) Applicant: Funai Electric Co., Ltd., Osaka (JP)

(72) Inventor: Eiji Nakata, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/102,901

(22) Filed: Aug. 14, 2018

(65) Prior Publication Data
US 2019/0058916 A1 Feb. 21, 2019

(30) Foreign Application Priority Data

Aug. 21, 2017 (JP) .................. 2017-158618

(51) Int. Cl.
| | | |
|---|---|---|
| *H04N 21/47* | (2011.01) | |
| *H04N 21/431* | (2011.01) | |
| *H04N 21/422* | (2011.01) | |
| *H04N 21/482* | (2011.01) | |
| *H04N 21/485* | (2011.01) | |
| *H04N 21/6547* | (2011.01) | |

(52) U.S. Cl.
CPC ... *H04N 21/4314* (2013.01); *H04N 21/42216* (2013.01); *H04N 21/47* (2013.01); *H04N 21/4821* (2013.01); *H04N 21/4858* (2013.01); *H04N 21/6547* (2013.01)

(58) Field of Classification Search
CPC ... H04N 21/2552; H04N 21/234; H04N 21/47
USPC ..................................... 725/37–61
See application file for complete search history.

(56) References Cited

U.S. PATENT DOCUMENTS

| | | | | |
|---|---|---|---|---|
| 6,246,442 | B1 * | 6/2001 | Harada | ............... G06F 17/211 348/563 |
| 7,197,759 | B2 * | 3/2007 | Barrett | ............... H04N 5/44543 348/E5.105 |
| 8,589,977 | B1 | 11/2013 | Frusciano | |
| 2002/0078451 | A1 * | 6/2002 | Nishina | ............... H04N 7/165 725/43 |

(Continued)

FOREIGN PATENT DOCUMENTS

| | | |
|---|---|---|
| EP | 2 190 189 A2 | 5/2010 |
| JP | 2007-74603 A | 3/2007 |

OTHER PUBLICATIONS

The extended European search report for the corresponding European application No. 18189358.7, dated Nov. 12, 2018.

*Primary Examiner* — Mushfikh I Alam
(74) *Attorney, Agent, or Firm* — Global IP Counselors, LLP

(57) ABSTRACT

A program information display terminal device includes a communication component, a display component and a controller. The communication component receives data of an electronic program guide from an external server. The display component displays the electronic program guide based on the data of the electronic program guide received by the communication component. The controller divides the data of the electronic program guide for each of a plurality of sections. The controller performs display control of the electronic program guide by using divided data of the electronic program guide that corresponds to one of the sections including program information that is displayed on the display component.

20 Claims, 14 Drawing Sheets

(56) References Cited

U.S. PATENT DOCUMENTS

| | | | |
|---|---|---|---|
| 2004/0123320 A1* | 6/2004 | Daily | H04N 5/44543 725/61 |
| 2006/0023116 A1 | 2/2006 | Kunieda et al. | |
| 2008/0178220 A1* | 7/2008 | Yamagishi | H04N 5/44543 725/41 |
| 2010/0088532 A1* | 4/2010 | Pollock | G06F 1/1626 713/324 |
| 2010/0205632 A1* | 8/2010 | VanDuyn | H04N 5/44543 725/39 |
| 2011/0162008 A1* | 6/2011 | Aldrey | H04N 21/235 725/40 |
| 2011/0173659 A1* | 7/2011 | Lafreniere | H04N 5/44543 725/40 |
| 2011/0239251 A1* | 9/2011 | Miller | H04N 21/235 725/40 |
| 2012/0297421 A1* | 11/2012 | Kim | H04N 5/445 725/41 |
| 2014/0053205 A1* | 2/2014 | Sirpal | G06F 3/017 725/49 |
| 2014/0164893 A1* | 6/2014 | Pariente | G06F 3/0482 715/207 |
| 2014/0189747 A1* | 7/2014 | Shellman | H04N 21/4314 725/52 |
| 2014/0282730 A1* | 9/2014 | Hieb | H04N 21/482 725/41 |
| 2014/0331261 A1* | 11/2014 | Kim | G06F 3/0346 725/52 |
| 2014/0337888 A1* | 11/2014 | Doan | H04N 21/4314 725/39 |
| 2015/0020111 A1 | 1/2015 | Stallings et al. | |
| 2015/0193804 A1* | 7/2015 | Liu | G06Q 30/0224 705/14.25 |
| 2016/0007086 A1* | 1/2016 | Ezequiel | H04H 20/20 725/48 |
| 2016/0080817 A1* | 3/2016 | Chai | H04N 21/4788 725/43 |
| 2016/0360261 A1* | 12/2016 | Makhlouf | H04N 21/2665 |

\* cited by examiner

FIRST EMBODIMENT

|  | | CH1 | CH2 | CH3 | ... | CH52 | CH53 | CH54 |
|---|---|---|---|---|---|---|---|---|
| DATA FOR FIRST DAY | AM0 ⋮ PM11 | | DISPLAY AREA 2a | | | | | |
| DATA FOR SECOND DAY | AM0 ⋮ PM11 | ////// | ////// | ////// | ////// | ////// | ////// | ////// |
| DATA FOR THIRD DAY | AM0 ⋮ PM11 | | | | | | | |
| DATA FOR FOURTH DAY | AM0 ⋮ PM11 | | | | | | | |
| DATA FOR FIFTH DAY | AM0 ⋮ PM11 | | | | | | | |
| DATA FOR SIXTH DAY | AM0 ⋮ PM11 | | | | | | | |
| DATA FOR SEVENTH DAY | AM0 ⋮ PM11 | | | | | | | |
| DATA FOR EIGHTH DAY | AM0 ⋮ PM11 | | | | | | | |

*FIG. 2*

FIRST TO SIXTH EMBODIMENTS

(a) DATA OF ELECTRONIC PROGRAM GUIDE FOR FIRST DAY (b) MANAGEMENT DATA FOR FIRST DAY

|  | POSITION | | SIZE | |
| --- | --- | --- | --- | --- |
|  | X COODINATE | Y COODINATE | WIDTH | HEIGHT |
| PROGRAM 1-1 | 0 | 0 | 180 | 60 |
| PROGRAM 1-2 | 0 | 60 | 180 | 60 |
| PROGRAM 1-3 | 0 | 120 | 180 | 160 |
| PROGRAM 2-1 | 180 | 0 | 180 | 20 |
| PROGRAM 2-2 | 180 | 20 | 180 | 60 |
| PROGRAM 2-3 | 180 | 80 | 180 | 60 |
| PROGRAM 2-4 | 180 | 140 | 180 | 20 |
| PROGRAM 2-5 | 180 | 160 | 180 | 120 |

FIRST EMBODIMENT

|      | CH1 | CH2 | CH3 | ... | CH52 | CH53 | CH54 |
|------|-----|-----|-----|-----|------|------|------|
| AM0  |     | DISPLAY AREA | DATA FOR FIRST DAY | | | | |
| ⋮    |     |     |     |     |      |      |      |
| PM11 |     |     |     |     |      |      |      |
| AM0  |     |     | DATA FOR SECOND DAY | | | DISPLAY AREA | |
| ⋮    |     |     |     |     |      |      |      |
| PM11 |     |     |     |     |      |      |      |

FIG. 4

FIRST EMBODIMENT

|      | CH1 | CH2 | CH3 | ... | CH52 | CH53 | CH54 |
|------|-----|-----|-----|-----|------|------|------|
| AM0  |     |     |     |     |      |      |      |
| ⋮    |     |     | DATA FOR FIRST DAY | | | | |
| PM11 |     |     |     |     |      |      |      |
| AM0  |     | DISPLAY AREA |     |     |      |      |      |
| ⋮    |     |     | DATA FOR SECOND DAY | | | | |
| PM11 |     |     |     |     |      |      |      |

FIG. 5

SECOND EMBODIMENT

| | | CH1 | CH2 | CH3 | · · · | CH52 | CH53 | CH54 |
|---|---|---|---|---|---|---|---|---|
| DATA FOR FIRST DAY | AM0 ⋮ PM11 | | DISPLAY AREA 2a | | | ///| /// | /// |
| DATA FOR SECOND DAY | AM0 ⋮ PM11 | | | | | /// | /// | /// |
| DATA FOR THIRD DAY | AM0 ⋮ PM11 | | | | | /// | /// | /// |
| DATA FOR FOURTH DAY | AM0 ⋮ PM11 | | | | | /// | /// | /// |
| DATA FOR FIFTH DAY | AM0 ⋮ PM11 | | | | | /// | /// | /// |
| DATA FOR SIXTH DAY | AM0 ⋮ PM11 | | | | | /// | /// | /// |
| DATA FOR SEVENTH DAY | AM0 ⋮ PM11 | | | | | /// | /// | /// |
| DATA FOR EIGHTH DAY | AM0 ⋮ PM11 | | | | | /// | /// | /// |

FIG. 7

THIRD EMBODIMENT

|  |  | CH1 | CH2 | CH3 | · · · | CH52 | CH53 | CH54 |
|---|---|---|---|---|---|---|---|---|
| DATA FOR FIRST DAY | AM0 ⋮ PM11 | | DISPLAY AREA 2a | | | | | |
| DATA FOR SECOND DAY | AM0 ⋮ PM11 | ///// | ///// | ///// | | | | |
| DATA FOR THIRD DAY | AM0 ⋮ PM11 | | | | | | | |
| DATA FOR FOURTH DAY | AM0 ⋮ PM11 | | | | | | | |
| DATA FOR FIFTH DAY | AM0 ⋮ PM11 | | | | | | | |
| DATA FOR SIXTH DAY | AM0 ⋮ PM11 | | | | | | | |
| DATA FOR SEVENTH DAY | AM0 ⋮ PM11 | | | | | | | |
| DATA FOR EIGHTH DAY | AM0 ⋮ PM11 | | | | | | | |

FIG. 8

PROGRAM INFORMATION DISPLAY TERMINAL DEVICE

CROSS-REFERENCE TO RELATED APPLICATIONS

This application claims priority to Japanese Patent Application No. 2017-158618 filed on Aug. 21, 2017. The entire disclosure of Japanese Patent Application No. 2017-158618 is hereby incorporated herein by reference.

BACKGROUND

Field of the Invention

The present invention relates to a program information display terminal device. More specifically, the present invention relates to a program information display terminal device for displaying an electronic program guide.

Background Information

Program information display terminal devices that display an electronic program guide have been known in the art (see, for example, Japanese Patent Application Publication No. 2007-74603 (Patent Literature 1)).

Patent Literature 1 discloses an electronic program guide display device comprising a display for displaying an electronic program guide. When the electronic program guide displayed on the display is scrolled through with a remote control, the electronic program guide display device is configured such that text in cells arranged in the same column as the program cell to be selected (for example, the same channel column) is displayed, and text in cells arranged in the other columns is undisplayed. This makes it possible to ascertain to which position of the electronic program guide the user has scrolled, compared with the case when text in all the program cells is made undisplayed during rapid scrolling.

SUMMARY

However, with the conventional program information display device described in Patent Literature 1, if there is a very large amount of data in the electronic program guide, then when processing corresponding to scrolling and other such user operations is performed using the data of the electronic program guide, the controller of the program information display device has to refer to (search through) a huge amount of data each time an operation is performed. Thus, a problem is that processing (such as rendering) slows down.

One object of the present invention is to provide a program information display terminal device with which the speed of processing user operations in an electronic program guide can be increased.

In view of the state of the known technology and in accordance with an aspect of the present invention, a program information display terminal device comprises a communication component, a display component and a controller. The communication component receives data of an electronic program guide from an external server. The display component displays the electronic program guide based on the data of the electronic program guide received by the communication component. The controller divides the data of the electronic program guide for each of a plurality of sections. The controller performs display control of the electronic program guide by using divided data of the electronic program guide that corresponds to one of the sections including program information that is displayed on the display component.

BRIEF DESCRIPTION OF THE DRAWINGS

Referring now to the attached drawings which form a part of this original disclosure:

FIG. 2 is a diagram illustrating divided sections in an electronic program guide in the first embodiment;

FIG. 4 is a diagram illustrating the processing when a section operated by the user is switched in the first embodiment;

FIG. 5 is a diagram illustrating the processing when the range of the electronic program guide displayed by the display component spans a plurality of sections in the first embodiment;

FIG. 7 is a diagram illustrating divided sections in the electronic program guide in the second embodiment;

FIG. 8 is a diagram illustrating divided sections in the electronic program guide in the third embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

First, the configuration of a display terminal device 100 in the first embodiment will be described through reference to FIGS. 1 to 6. The display terminal device 100 is an example of the "program information display terminal device" of the present application.

Configuration of Display Terminal Device

Figure 1:
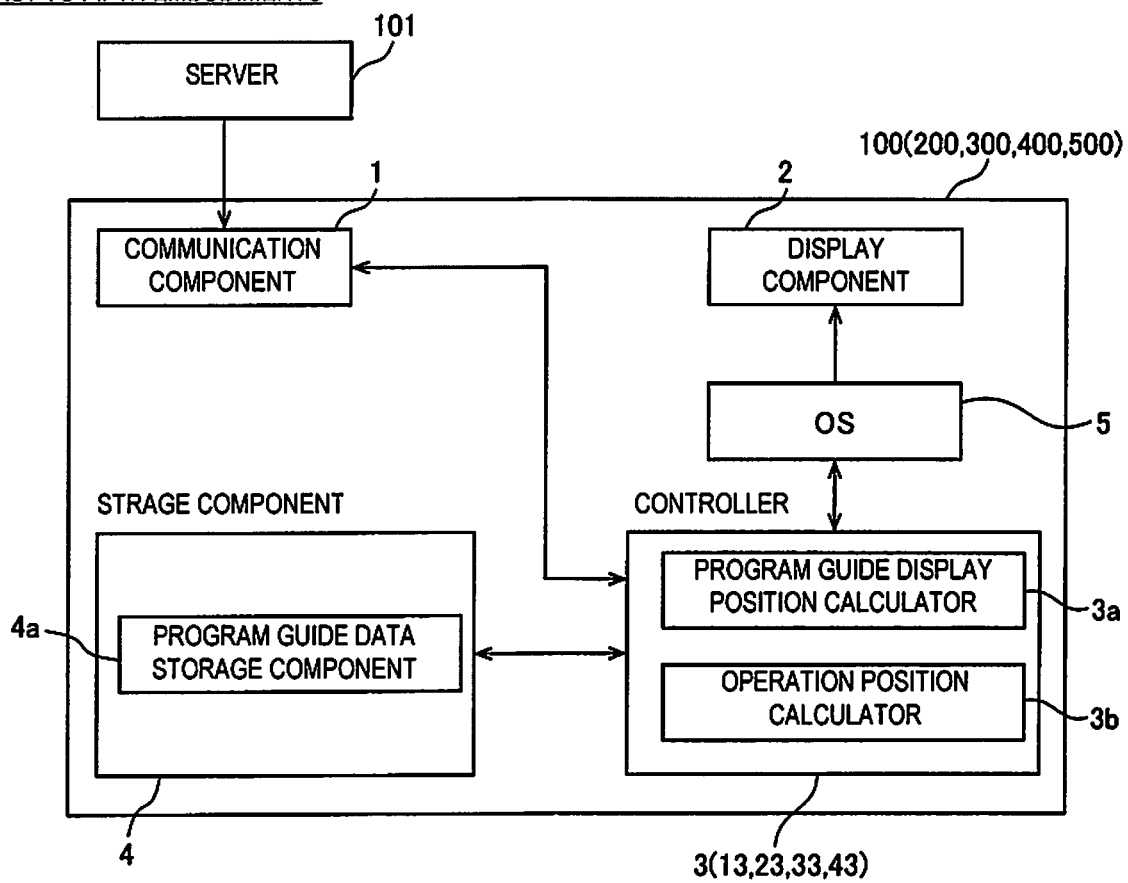
FIG. 1 is a diagram showing the configuration of a program information display terminal device in first to fifth embodiments.

As shown in FIG. 1, the display terminal device 100 comprises a communication component 1, a display component 2, a controller 3, and a storage component 4. The display terminal device 100 is a portable information terminal device such as a smartphone or a tablet. For example, with this display terminal device 100, it is possible to record a program (or television program) in conjunction with a device such as a television by setting the program to record from an electronic program guide (or electronic program table) (discussed below) in the display terminal device 100. The electronic program guide is a time table of programs that are broadcasted on each channels, for example, and indicates program information of the programs, such as program name, program content, and the like.

The communication component 1 receives the data of the electronic program guide (see FIG. 2) stored in an external server 101 that is connected via a network. For example, the external server 101 stores data of the electronic program guide for eight days (from the first day to the eighth day) for CH 1 (channel 1) to CH 54 (channel 54). In the first embodiment, the communication component 1 is configured to receive data in units of two days. The reception units of the data with the communication component 1 are not limited to this. In the illustrated embodiment, the communication component 1 includes a communication module or circuit, such as an integrated circuit. In particular, the communication component 1 includes a wireless or wired communication module or circuit that receives the data of the electronic program guide from the external server 101 via a wireless or wired network.

Also, when the reception of data is complete, the communication component 1 transmits a signal to the controller 3 to notify that data acquisition is complete. In the electronic program guide, the vertical axis is the time axis and the horizontal axis is the channel axis (see FIG. 2). Thus, the vertical direction along the vertical axis is a time axis direction of the electronic program guide, while the horizontal direction along the horizontal axis is a channel axis direction of the electronic program guide. In the following description, it is assumed that all the data for 8 days has already been received by the communication component 1.

The display component 2 displays the electronic program guide based on the data of the electronic program guide received by the communication component 1. The display method will be described in detail below. In the illustrated embodiment, the display component 2 is a display. Specifically, the display component 2 is a display, such as a liquid crystal display, an organic electro-luminescence display, or any other type of display as needed and/or desired.

As shown in FIG. 2, the controller 3 (see FIG. 1) divides up the data of the electronic program guide into a plurality of sections. In the first embodiment, the term "section" means a range or area divided up in the time axis direction (for each date) in the electronic program guide. In FIG. 2, one of the sections is shown as a hatched range. That is, the controller 3 divides up the data of the electronic program guide into data for the first day, data for the second day, data for the third day, and so on up to the eighth day. In the following description, each section is labeled as the section for the first day, the section for the second day, and so forth for the sake of simplicity. In the illustrated embodiment, the controller 3 is an electronic controller, such as a microcomputer or processor. The controller 3 can further include other conventional components such as an input interface circuit, an output interface circuit, and storage devices, such as a ROM (Read Only Memory) device and a RAM (Random Access Memory) device, flash memory, etc. For example, the internal RAM of the controller 3 stores processing results of the controller 3. The internal ROM of the controller 3 stores the information and programs for various operations. It will be apparent to those skilled in the art from this disclosure that the precise structure and algorithms for the controller 3 can be any combination of hardware and software that will carry out the functions of the display terminal device 100 as described herein.

In the first embodiment, the controller 3 is configured to divide up the electronic program guide into a plurality of sections such that at least some of the sections have substantially equal sizes in the electronic program guide. More specifically, in the first embodiment, each of the plurality of sections includes a range from 12:00 AM (AM0 in FIG. 2) to 11:59 PM for CH 1 to CH 54 in the electronic program guide. Thus, all the sections are substantially the same sizes. Since the start time of the section for the first day is the time at which the data of the electronic program guide is acquired, depending on the time at which the data is acquired, only the size of the section for the first day may be different.

In the first embodiment, the controller 3 is configured to perform processing corresponding to user operations by using the divided data of the electronic program guide corresponding to the section operated by the user. More specifically, the controller 3 is configured to perform processing corresponding to a user operation by using management data (discussed below) corresponding to the section operated by the user. The section operated by the user is an example of the "section including the program information that is displayed on the display component" of the present application. Also, the processing corresponding to a user operation is an example of the "display control of the electronic program guide" of the present application. For example, processing corresponding to a user operation by the controller 3 includes display control for scrolling and zooming in the electronic program guide.

Figure 3:
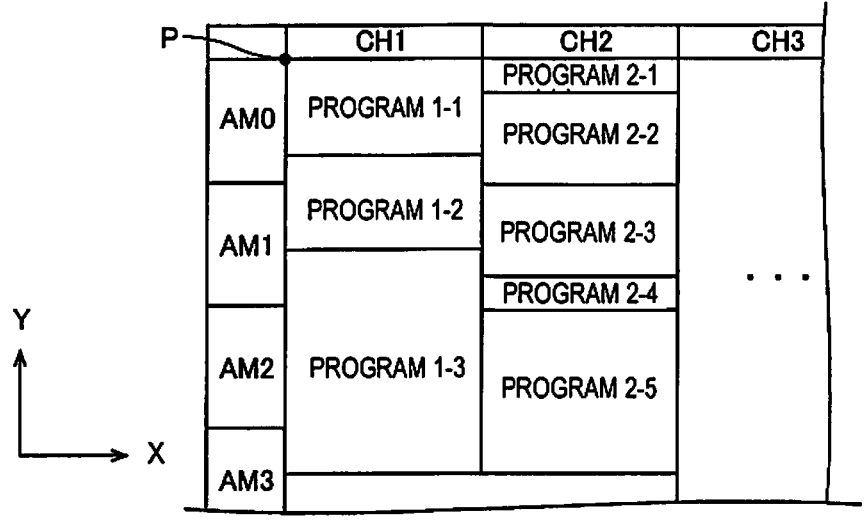
FIG. 3 shows diagrams illustrating management data of the program information display terminal device in the first to sixth embodiments, FIG. 3(a) illustrating a part of the data in the electronic program guide, and FIG. 3(b) illustrating management data produced from the data in the electronic program guide in FIG. 3(a)

For example, as shown in FIG. 2, when the user is operating in the section for the first day, the controller 3 performs processing corresponding to the user operation by using the management data for the first day (see FIG. 3(*b*)) produced based on the data of the electronic program guide for the first day (see FIG. 3(*a*)).

In the first embodiment, as shown in FIG. 3, the controller 3 (see FIG. 1) is configured to produce and manage the management data (see FIG. 3(*b*)) for each of the sections. The management data includes program position information (e.g., position information) and information about the size (e.g., size information) of the program cell in which the program information is displayed. In particular, the program position information indicates a position at which the program information is displayed on the display component 2. The information about the size indicates the size of the program cell. More specifically, the controller 3 individually produces and manages the management data corresponding to the section for the first day, the management data corresponding to the section for the second day, and so on up to the management data corresponding to the section for the eighth day. Hereinafter, the management data corresponding to each section will be referred to as management data for the first day, management data for the second day, and so on, for the sake of simplicity.

More specifically, the controller 3 is configured to function as a program guide display position calculator or calculation means 3a (see FIG. 1) and an operation position calculator or calculation means 3b (see FIG. 1). The program guide display position calculator 3a of the controller 3 calculates the coordinates at which each program information is disposed and the size of each program cell based on channel information for each program, and information about the start and end time of each program that are acquired from the data of the electronic program guide corresponding to each section (see FIG. 3(a)). As the coordinates of each program information, the program guide display position calculator 3a calculates the X coordinate (the coordinate on the channel axis) and the Y coordinate (the coordinate on the time axis) of the upper-left point of each program cell (for example, the point P at program 1-1 (see FIG. 3(a))). The program guide display position calculator 3a also calculates the size of each program cell in the X direction (e.g., the channel axis direction) and the size in the Y direction (e.g., the time axis direction). In the controller 3, the functions of the program guide display position calculator 3a and the operation position calculator 3b can be realized by software such as a computer program.

Also, when the user performs a zooming operation, the management data is updated. For example, when the zoom is doubled in the time axis direction, the Y coordinate and the height of the management data are updated. More specifically, for the program 1-2, for example, the Y coordinate is updated to 120 and the height is updated to 120 (because the height of the program 1-1 is doubled). The data of the electronic program guide received by the communication component 1 (see FIG. 1) and the management data produced by the program guide display position calculator 3a of the controller 3 are stored in a program guide data storage component 4a (see FIG. 1) of the storage component 4 (see FIG. 1). If the user zooms in in the channel axis direction, the management data may be updated in the same manner as in the time axis direction. In this case, the X coordinate and width of the management data are updated. Thus, in the illustrated embodiment, the controller 3 updates the management data in response to the controller 3 performing the display control of the electronic program guide. Specifically, the controller 3 updates the management data in response to the controller 3 performing zooming operation of the electronic program guide. In the illustrated embodiment, the storage component 4 is a computer memory, such as a ROM (Read Only Memory) device and a RAM (Random Access Memory) device, flash memory, etc. However, the storage component 4 can be any type of computer memory as needed and/or desired.

The operation position calculator 3b of the controller 3 detects which section the user is operating. The operation position calculator 3b then refers to the management data corresponding to the section that is being operated by the user, and calculates the user operation position (coordinates). Also, the program guide display position calculator 3a of the controller 3 decides or acquires a display area or region 2a (see FIG. 2) based on the size of the screen of the display component 2 and the user operation position (coordinates) calculated by the operation position calculator 3b. Then, in response to an inquiry from an OS (operating system) 5 (see FIG. 1) about the area to be displayed on the display component 2, the controller 3 sends a notification of the display area 2a decided or acquired by the program guide display position calculator 3a of the controller 3. The function of the OS can be realized by software such as a program. The display area 2a is an example of the "range of the electronic program guide that is displayed by the display component" of the present application.

In the first embodiment, as shown in FIG. 4, the controller 3 (see FIG. 1) is configured such that when a section that is being operated by the user is switched by scrolling, processing corresponding to the user operation is performed based on management data corresponding to the section after the switch. Specifically, when a section (e.g., one of the sections) that include the program information displayed on the display component 2 is switched to a different section (e.g., different one of the sections) by scrolling, the controller 3 perform the display control of the electronic program guide based on the management data corresponding to the different section. For instance, when the display area 2a (see FIG. 2) is disposed in the section for the first day, the controller 3 performs processing corresponding to the user operation using only the management data for the first day. Also, after the display area 2a has moved to the section for the second day (shown with hatching in FIG. 2), the controller 3 performs processing corresponding to the user operation using only the management data for the second day. Thus, in the illustrated embodiment, the controller 3 performs processing corresponding to the user operation (e.g., display control of the electronic program guide) by using only the management data (or by using only part of the electronic program guide) that corresponds to the section including the program information that is being displayed on the display component.

In the first embodiment, as shown in FIG. 5, when the display area 2a (see FIG. 2) spans a plurality of sections (e.g., at least two of the sections), the controller 3 (see FIG. 1) performs processing corresponding to the user operation based on a plurality of sets of management data corresponding to the plurality of sections within the display area 2a. For example, when the display area 2a spans the section for the first day and the section for the second day, the controller 3 performs processing corresponding to the user operation using only the management data for the first day and the management data for the second day. In other words, when the display area 2a spans two of the sections, the controller 3 performs processing corresponding to the user operation by using only the two of the sections, without using the rest of the sections.

Method for Displaying Electronic Program Guide on Display Component

Figure 6:
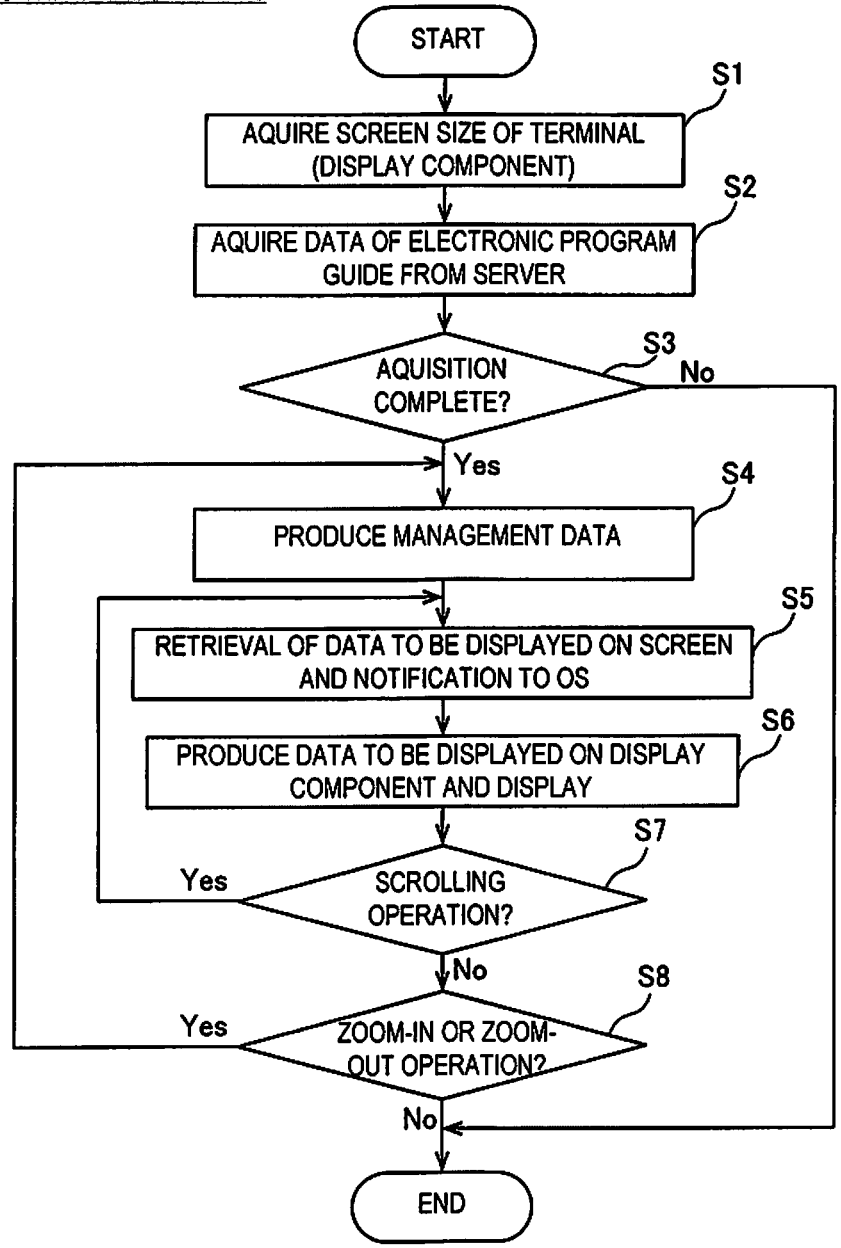
FIG. 6 is a flowchart illustrating a method for displaying the electronic program guide on the display component in the first to third embodiments.

Referring now to FIG. 6, the method for displaying the electronic program guide on the display component 2 by the controller 3 of the display terminal device 100 in the first embodiment will now be described.

First, in step S1, the screen size of the display terminal device 100 (display component 2) is acquired. The screen size can be acquired from the OS.

Next, in step S2, the data of the electronic program guide is acquired (via the communication component 1) from the server 101.

Next, in step S3, it is determined whether or not the acquisition of the data of the electronic program guide has been completed. If the acquisition of the data is complete, then the flow proceeds to step S4. If the acquisition of the data is not complete, then the processing is ended. Of course, if the acquisition of the data is not complete, the processing in step S2 can be continued.

Next, in step S4, management data for each section is produced from the data of the electronic program guide acquired in step S3. The management data is managed for each section.

Next, in step S5, the data to be displayed on the screen of the display component 2 is retrieved from the management data of the section that is being operated by the user, and the OS is notified of this. Here, if the display area 2a spans a plurality of sections (see FIG. 5), then the data to be displayed on the screen of the display component 2 is retrieved from the management data of all the sections included in the display area 2a. In this case, the OS is also notified of the data of the electronic program guide of the section that is being operated by the user.

Next, in step S6, the data to be displayed on the display component 2 is produced based on the data of which the OS has been notified in step S5, and this data is displayed on the display component 2.

Next, in step S7, it is determined whether or not a scrolling operation has been performed by the user. If a scrolling operation has been performed, then the flow returns to step S5. If a scrolling operation has not been performed, then the flow proceeds to step S8.

Next, in step S8, it is determined whether or not the user has performed a zoom-in or zoom-out operation. If a zoom-in or zoom-out operation has been performed, then the flow returns to step S4. If zoom-in or zoom-out processing has not been performed, then the processing is ended.

Effect of First Embodiment

The following effect can be obtained with the first embodiment.

In the first embodiment, as described above, the display terminal device 100 is configured such that the controller 3 is provided for dividing up the data of the electronic program guide for each of a plurality of sections, and the controller 3 performs processing corresponding to a user operation by using the divided data of the electronic program guide corresponding to the section that is being operated by the user. Consequently, processing corresponding to the user operation can be performed using only the data of the electronic program guide corresponding to the section that is being operated by the user. As a result, the amount of data used can be reduced as compared to when processing is performed using all the data of the electronic program guide. Specifically, the amount of data used for the display control of the electronic program guide is only part of the data of the electronic program guide that corresponds to the section including the program information that is being displayed on the display component 2. Thus, the control load on the controller 3 can be reduced. As a result, it is possible to speed up the processing (such as rendering the electronic program guide) with respect to a user operation in the electronic program guide.

Also, in the first embodiment, as described above, the display terminal device 100 is configured such that the controller 3 produces and manages management data including position information indicating the position where the program information is displayed on the display component 2 and information about the size of the program cell in which the program information is displayed, for each of a plurality of sections. Consequently, the program information can be retrieved and displayed using only the management data corresponding to part of the sections, out of the plurality of sets of management data provided for each of the sections. Thus, searching for and displaying program information can be performed faster than when using a single set of management data corresponding to all the entire electronic program guide.

In the first embodiment, as described above, the display terminal device 100 is configured such that the controller 3 performs processing corresponding to a user operation by using the management data corresponding to the section that is being operated by the user. In other words, the controller 3 performs the display control of the electronic program guide by using the management data that corresponds to a section including the program information that is displayed on the display component 2. Consequently, processing can be performed using only the management data corresponding to the section that is being operated by the user. Thus, processing can be performed without using unnecessary management data corresponding to sections other than the section that is being operated by the user. As a result, processing in which program information is retrieved from management data based on a user operation can be carried out more easily and faster.

Also, in the first embodiment, as described above, the display terminal device 100 is configured such that when the display area 2a spans a plurality of sections, the controller 3 performs processing corresponding to the user operation based on a plurality of sets of management data corresponding to the plurality of sections in the display area 2a. Consequently, processing can be performed using not only the management data corresponding to the section operated by the user, but also the management data corresponding to all the sections in the display area 2a. As a result, even when the display area 2a spans a plurality of sections, the appropriate program information can still be displayed on the display component 2.

Also, in the first embodiment, as described above, the display terminal device 100 is configured such that when the user scrolls to switch the section being operated, the controller 3 performs processing corresponding to the user operation based on the management data corresponding to the section after the switch. Consequently, even after the section being operated by the user is switched, processing can be performed using the appropriate management data.

In the first embodiment, as described above, the display terminal device 100 is configured such that the controller 3 produces and manages the management data for each of a plurality of sections that are formed or defined by dividing the electronic program guide in the time axis direction of the electronic program guide. Consequently, when there is a large amount of data in the time axis direction, the amount of management data corresponding to each section can easily be reduced. As a result, when there is a large amount of data in the time axis direction, it is easy to speed up the processing corresponding to a user operation in the electronic program guide.

Also, dividing up the electronic program guide in the time axis direction makes it less likely that the display area 2a will span a plurality of sections in the channel axis direction. This helps avoid the use of a plurality of sets of management data in the processing by the controller 3. Thus, it is less likely that the processing by the controller 3 will slow down. That is, dividing up the electronic program guide in the time axis direction is particularly effective when scrolling in the channel axis direction.

Also, in the first embodiment, as described above, the display terminal device 100 is configured such that the controller 3 divides up the electronic program guide into a plurality of sections such that at least some of the sections have substantially equal sizes. Consequently, the control load on the controller 3 can be reduced as compared to when the size is set for each section.

In the first embodiment, as described above, the display terminal device 100 is configured such that the processing corresponding to a user operation by the controller 3 includes display control for scrolling and zooming in the electronic program guide. This makes it possible to speed up the rendering of the electronic program guide in response to a user operation of scrolling and zooming in the electronic program guide.

Second Embodiment

Referring now to FIG. 7, the configuration of a display terminal device 200 pertaining to a second embodiment will be described. Unlike the first embodiment in which the electronic program guide is divided up into a plurality of sections in the time axis direction, the display terminal device 200 in this second embodiment is configured such that the electronic program guide is divided up into a plurality of sections in the channel axis direction. Those components that are the same as in the first embodiment will be numbered the same as in the first embodiment and will not be described again. The display terminal device 200 is an example of the "program information display terminal device" of the present application.

In the second embodiment, as shown in FIG. 7, a controller 13 (see FIG. 1) of the display terminal device 200 (see FIG. 1) is configured to produce and manage management data for each of a plurality of sections that are formed or defined by dividing the electronic program guide in the channel axis direction of the electronic program guide. In the second embodiment, the term "section" means a range or area of the electronic program guide that is divided up for every three channels in the electronic program guide (such as the hatched range in FIG. 7). That is, the controller 13 divides up the data of the electronic program guide into data of the electronic program guide from CH 1 to CH 3 on the first day to the eighth day, data of the electronic program guide of CH 4 to CH 6 on the first day to the eighth day, and so on up to data of electronic program guide from CH 52 to CH 54 on the first day to the eighth day. In the following description, each section is referred to as the section for CH 1 to CH 3, the section for CH 4 to CH 6, and so forth for the sake of simplicity.

The controller 13 then produces and manages management data corresponding to each section from the data of the electronic program guide corresponding to each of the divided sections. More specifically, the controller 13 individually produces and manages management data corresponding to the section of CH 1 to CH 3, management data corresponding to the section of CH 4 to CH 6, and so on up to management data corresponding to the section of CH 52 to CH 54.

The rest of the configuration of the second embodiment is the same as in the first embodiment above.

Effect of Second Embodiment

The following effect can be obtained with the second embodiment.

In the second embodiment, as described above, the display terminal device 200 is configured such that the controller 13 produces and manages management data for each of a plurality of sections that are formed or defined by dividing the electronic program guide in the channel axis direction of the electronic program guide. Consequently, when there are a large number of channels in the electronic program guide and there is a large amount of data in the channel axis direction, the amount of management data corresponding to each section can easily be reduced. As a result, when there is a large amount of data in the channel axis direction, it is easy to speed up the processing corresponding to a user operation in the electronic program guide.

Also, it is less likely that the display area 2a will span a plurality of sections in the time axis direction. This makes it less likely that a plurality of sets of management data will be used in the processing by the controller 13. Thus, the processing of the controller 13 is less likely to slow down. That is, dividing up the electronic program guide in the channel axis direction is particularly effective when scrolling in the time axis direction.

The other effects of the second embodiment are the same as in the first embodiment.

Third Embodiment

Next, the configuration of a display terminal device 300 pertaining to a third embodiment will be described through reference to FIG. 8. Unlike the first embodiment in which the electronic program guide is divided up into a plurality of sections in the time axis direction, the display terminal device 300 in this third embodiment is configured such that the electronic program guide is divided up into a plurality of sections both in the time axis direction and in the channel axis direction. Those components that are the same as in the first embodiment will be numbered the same as in the first embodiment and will not be described again. The display terminal device 300 is an example of the "program information display terminal device" of the present application.

In the third embodiment, as shown in FIG. 8, the controller 23 (see FIG. 1) of the display terminal device 300 (see FIG. 1) is configured to produce and manage management data for each of a plurality of sections that are formed or defined by dividing the electronic program guide in the time axis direction of the electronic program guide and in the channel axis direction of the electronic program guide. In the third embodiment, the term "section" means a range or area of the electronic program guide that is divided up by date on the vertical axis (the time axis) of the electronic program guide and is divided up for every three channels on the horizontal axis (the channel axis) of the electronic program guide (such as the hatched range in FIG. 8). That is, the controller 23 divides up the data of the electronic program guide into the data of the electronic program guide from CH 1 to CH 3 for the first day, the data of the electronic program guide from CH 1 to CH 3 for the second day, and so forth up to the data of the electronic program guide from CH 52 to CH 54 for the seventh day, and data of the electronic program guide from CH 52 to CH 54 for the eighth day. In the following description, to simplify the description, each section will be referred to as a section from CH 1 to CH 3 for the first day, a section from CH 4 to CH 6 for the second day, and so on.

The controller 23 then produces and manages management data corresponding to each of the sections from the data of the electronic program guide corresponding to the divided sections. More specifically, the controller 23 individually produces and manages management data corresponding to the section from CH 1 to CH 3 for the first day, management data corresponding to the section from CH 4 to CH 6 for the second day, and so forth up to management data corresponding to the section from CH 52 to CH 54 for the seventh day, and management data corresponding to the section from CH 52 to CH 54 for the eighth day.

The rest of the configuration of the third embodiment is the same as in the first embodiment.

Effect of Third Embodiment

The following effect can be obtained with the third embodiment.

In the third embodiment, as described above, the display terminal device 300 is configured such that the controller 23 produces and manages management data for each of a plurality of sections that are formed or defined by dividing the electronic program guide in the time axis direction of the electronic program guide and in the channel axis direction of the electronic program guide. Consequently, when there is a large amount of data in both the time axis direction and the channel axis direction, the amount of management data corresponding to each section can be effectively reduced. As a result, when there is a large amount of data in both the time axis direction and the channel axis direction, it is possible to effectively speed up the processing corresponding to a user operation in the electronic program guide.

Also, since the amount of management data in each section is relatively small, even when the display area 2a spans a plurality of sections, the processing of the controller 23 is less likely to be slowed down. That is, dividing up the electronic program guide in both the time axis direction and the channel axis direction is particularly effective when scrolling in an oblique direction that intersects the time axis direction and the channel axis direction.

The other effects of the third embodiment are the same as in the first embodiment.

Fourth Embodiment

Next, the configuration of a display terminal device 400 pertaining to a fourth embodiment will be described through reference to FIGS. 9 and 10. Unlike the first embodiment in which the electronic program guide is divided up into a plurality of sections in the time axis direction, the display terminal device 400 in the fourth embodiment is configured such that the division direction of the sections is determined based on the user's scrolling direction. Those components that are the same as in the first embodiment will be numbered the same as in the first embodiment and will not be described again. The display terminal device 400 is an example of the "program information display terminal device" of the present application.

Figure 9:
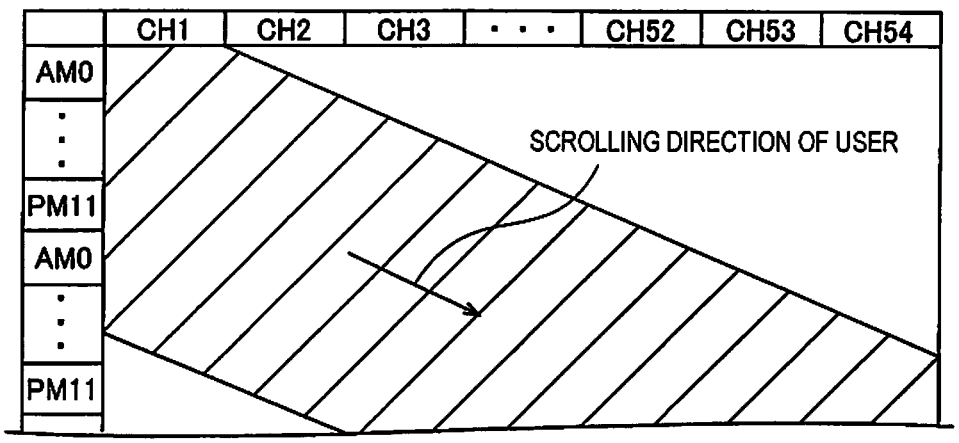
FIG. 9 shows diagrams illustrating divided sections in the electronic program guide in the fourth embodiment, FIG. 9(a) illustrating divided sections when the user is scrolling to the lower right, and FIG. 9(b) illustrating divided sections when the user is scrolling to the upper right.
Figure 9:
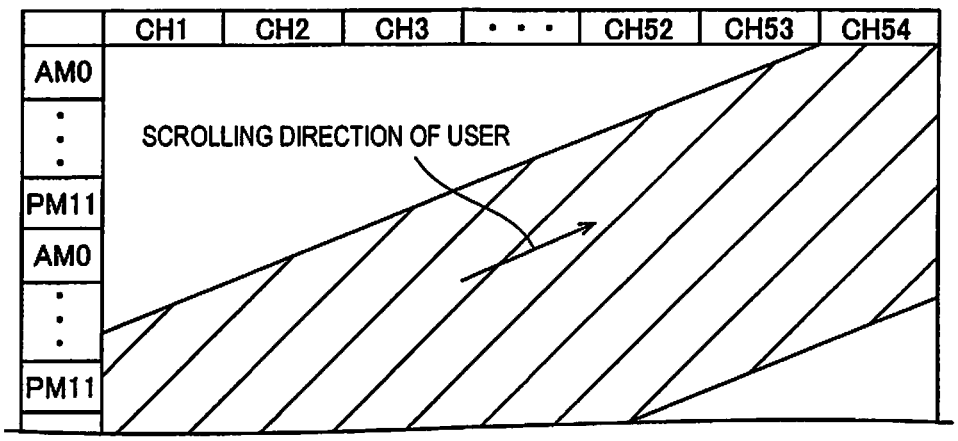

In the fourth embodiment, as shown in FIG. 9(*a*), the controller 33 (see FIG. 1) of the display terminal device 400 is configured to divide up the data of the electronic program guide into a plurality of sections such that each of the plurality of sections extends along the user's scrolling direction (such as the hatched range in FIG. 9). For example, when the user scrolls to the lower right, each of the plurality of sections is provided extending substantially in parallel with the scrolling direction of the user. Although not depicted, when the scrolling direction of the user is in the horizontal direction, it is divided up in the same way as in the first embodiment, and when the scrolling direction of the user is vertical, it is divided up as in the second embodiment.

Also, in the fourth embodiment, as shown in FIG. 9(*b*), the controller 33 (see FIG. 1) is configured to change the direction in which each of the plurality of sections (such as the hatched range in FIG. 9) extends, each time the user scrolling direction changes. More specifically, when the scrolling direction of the user changes from the lower right (see FIG. 9(*a*)) to the upper right (see FIG. 9(*b*)), each of the plurality of sections changes from a state of extending toward the lower right (see FIG. 9(*a*)) to a state of extending toward the upper right (see FIG. 9(*b*)).

Method for Displaying Electronic Program Guide on Display Component

Figure 10:
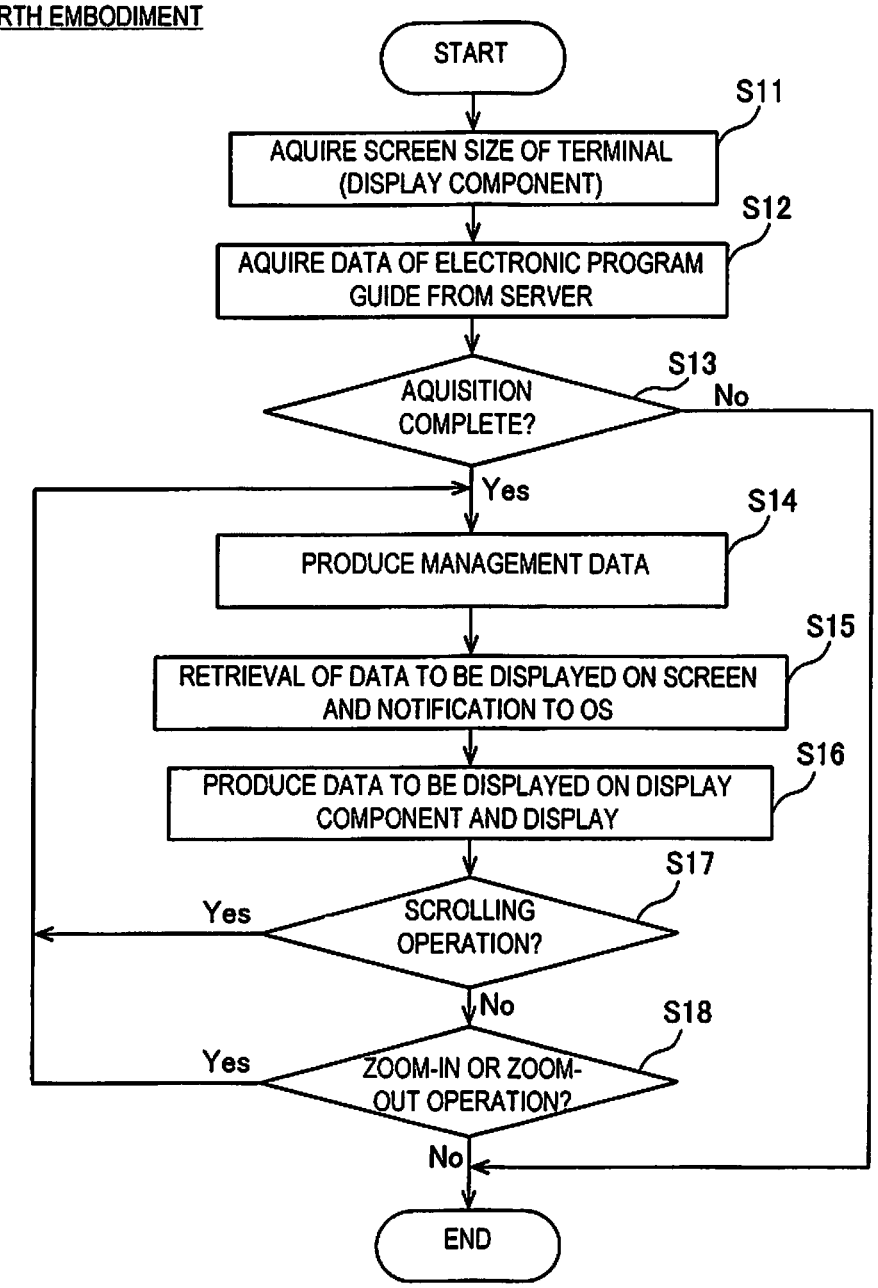
FIG. 10 is a flowchart illustrating a method for displaying the electronic program guide on the display component in the fourth embodiment.

Referring now to FIG. 10, the method for displaying the electronic program guide on the display component 2 by the controller 33 of the display terminal device 400 in the fourth embodiment will be described.

First, in step S11, the screen size of the display terminal device 400 (display component 2) is acquired. The screen size can be acquired from the OS.

Next, in step S12, the data of the electronic program guide is acquired from the server 101 (via the communication component 1).

Next, in step S13, it is determined whether or not the acquisition of the data of the electronic program guide is complete. If the acquisition of the data is complete, then the flow proceeds to step S14. If the acquisition of the data is not complete, then the processing is ended. Of course, if the acquisition of the data is not complete, the processing in step S12 can be continued.

Next, in step S14, management data is produced for each section from the data of the electronic program guide acquired in step S13. The management data is managed for each section. The management data produced first may be the same management data as in the first embodiment, for example.

Next, in step S15, the data to be displayed on the screen of the display component 2 is retrieved from the management data for the section that is being operated by the user, and the OS is notified. Here, if the display area 2a spans a plurality of sections, then the data to be displayed on the screen of the display component 2 is retrieved from the management data for all of the sections included in the display area 2a. In this case, the OS is also notified of the data of the electronic program guide of the section that is being operated by the user.

Next, in step S16, the data to be displayed on the display component 2 is produced based on the data of which the OS has been notified in step S15, and this data is displayed on the display component 2.

Next, in step S17, it is determined whether or not a scrolling operation has been performed by the user. If a scrolling has been performed, then the flow returns to step S14. In this case, in step S14, management data corresponding to the section extending along the scrolling direction of the user is produced. If a scrolling operation has not been performed, then the flow proceeds to step S18.

Next, in step S18, it is determined whether or not the user has performed a zoom-in or zoom-out operation. If a zoom-in or zoom-out operation has been performed, then the flow returns to step S14. If zoom-in or zoom-out processing has not been performed, then the processing is ended.

The rest of the configuration of the fourth embodiment is the same as in the first embodiment.

Effect of Fourth Embodiment

The following effect can be obtained with the fourth embodiment.

In the fourth embodiment, as described above, the display terminal device 400 is configured such that the controller 33 divide the data of the electronic program guide for a plurality of sections such that each of the sections extends along the scrolling direction of the user. Consequently, it is less likely that the number of sections operated (passed through) by user scrolling will increase, as compared to when the plurality of sections each extend in a direction different from the scrolling direction. Thus, it is possible to reduce the number of times the data (management data) of the electronic program guide used for processing corresponding to a user operation is switched. As a result, the control load on the controller 33 can be reduced, and it is less likely that the processing of the controller 33 will be slowed down.

Also, since each of the plurality of sections extends along the scrolling direction, the likelihood that the display area 2a will span a plurality of sections can be effectively reduced. This makes it possible to effectively reduce the likelihood that the processing of the controller 33 will slow down.

Also, in the fourth embodiment, as described above, the display terminal device 400 is configured such that the controller 33 changes the direction in which each of the sections extends every time the user scrolling direction changes (e.g., in response to the scrolling direction changing). Consequently, it is possible to more reliably reduce the number of times the data (management data) of the electronic program guide used for processing corresponding to a user operation is switched.

Also, as compared to when the direction in which the sections are divided up is fixed, the likelihood that the display area 2a will span a plurality of sections can be reduced even more effectively. This means that the likelihood that the processing of the controller 33 will slow down can be reduced even more effectively.

The other effects of the fourth embodiment are the same as in the first embodiment.

Fifth Embodiment

Next, the configuration of a display terminal device 500 pertaining to a fifth embodiment will be described through reference to FIGS. 11 and 12. Unlike the first embodiment in which the electronic program guide is divided into a plurality of sections in the time axis direction, the display terminal device 500 in the fifth embodiment is configured such that the electronic program guide is divided up into a plurality of sections based on the state of the screen of the display component 2. Those components that are the same as in the first embodiment will be numbered the same as in the first embodiment and will not be described again. The display terminal device 500 is an example of the "program information display terminal device" of the present application.

Figure 11:
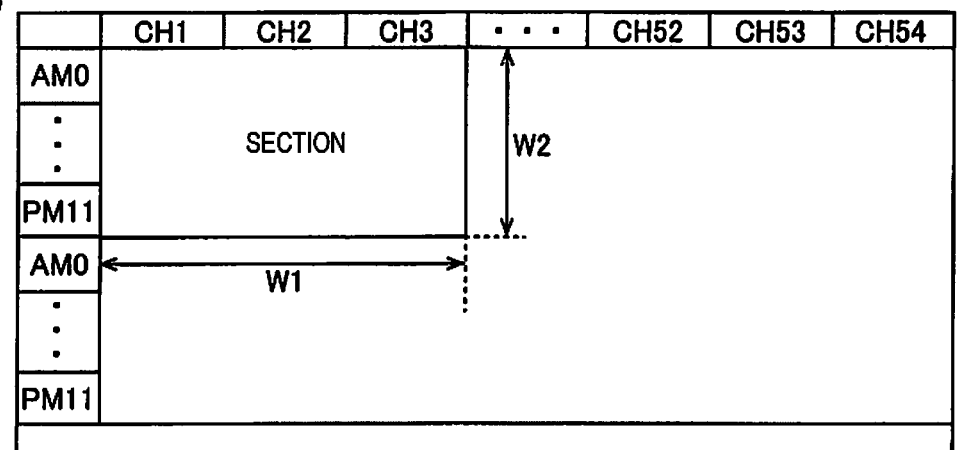
FIG. 11 shows diagrams illustrating a divided section in the electronic program guide in the fifth embodiment, FIG. 11(a) illustrating a diagram illustrating a section when the screen of the display component is wider than it is tall, and FIG. 11(b) illustrating a diagram illustrating a section when the screen of the display component is taller than it is wide.
Figure 11:
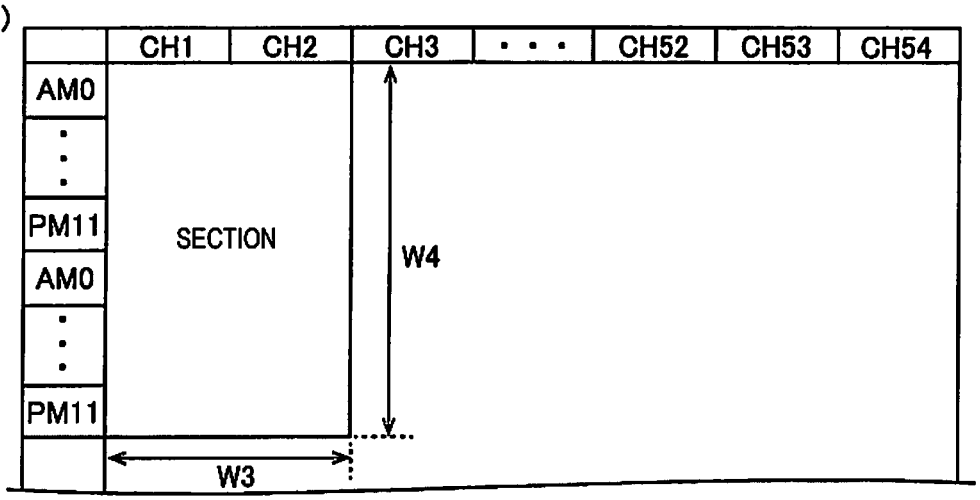

In the fifth embodiment, as shown in FIG. 11, a controller 43 (see FIG. 1) of the display terminal device 500 (see FIG. 1) is configured such that when the data of the electronic program guide is divided up into a plurality of sections, the controller 43 determines the size of each of the plurality of sections based on the size of the screen of the component 2 (see FIG. 1) and the orientation of the screen of the display component 2. More specifically, as shown in FIG. 11(a), the controller 43 determines the width W1 and the width W2 (less than the width W1) of the sections based on the size of the screen of the display component 2. For instance, the sections on a tablet having a relatively large screen size will be larger than the sections on a smartphone having a relatively small screen size. FIG. 11 is a simplified view in which only a single section is shown, but the electronic program guide is actually divided up into a plurality of sections.

In the fifth embodiment, the controller 43 is configured to divide up the data of the electronic program guide for each of a plurality of sections such that when the screen of the display component 2 is taller than it is wide, each of the sections is taller than it is wide, and when the screen of the display component 2 is wider than it is tall, each of the sections is wider than it is tall.

That is, as shown in FIG. 11(a), when the screen of the display component 2 is wider than it is tall, the lateral width W1 of the section is greater than the vertical width W2 of that section. Also, as shown in FIG. 11(b), when the screen of the display component 2 is taller than it is wide, the lateral width W3 of the section is less than the vertical width W4 of that section. The ratio of the lateral width W1 to the vertical width W2 and the ratio of the lateral width W3 to the vertical width W4 may each be equal to the aspect ratio of the screen of the display component 2. Also, if the lateral width W1 is greater than the vertical width W2, and the lateral width W3 is less than the vertical width W4, the ratio of the lateral width W1 to the vertical width W2 and the ratio of the lateral width W3 to the vertical width W4 may each differ from the aspect ratio of the screen of the display component 2. Also, the horizontal width W1 and the vertical width W4 may be equal, and the vertical width W2 and the horizontal width W3 may be equal.

Let us assume that the screen of the display component 2 has been rotated 90 degrees when the screen of the display component 2 is wider than it is tall and the sections have the lateral width W1 and the vertical width W2 (see FIG. 11(a)). In this case, the controller 43 changes the size of a section such that the section has the horizontal width W3 and the vertical width W4. In other words, the controller 43 changes an aspect ratio of the sections in response to the orientation of the screen of the display component 2 changing.

Method for Displaying Electronic Program Guide on Display Component

Figure 12:
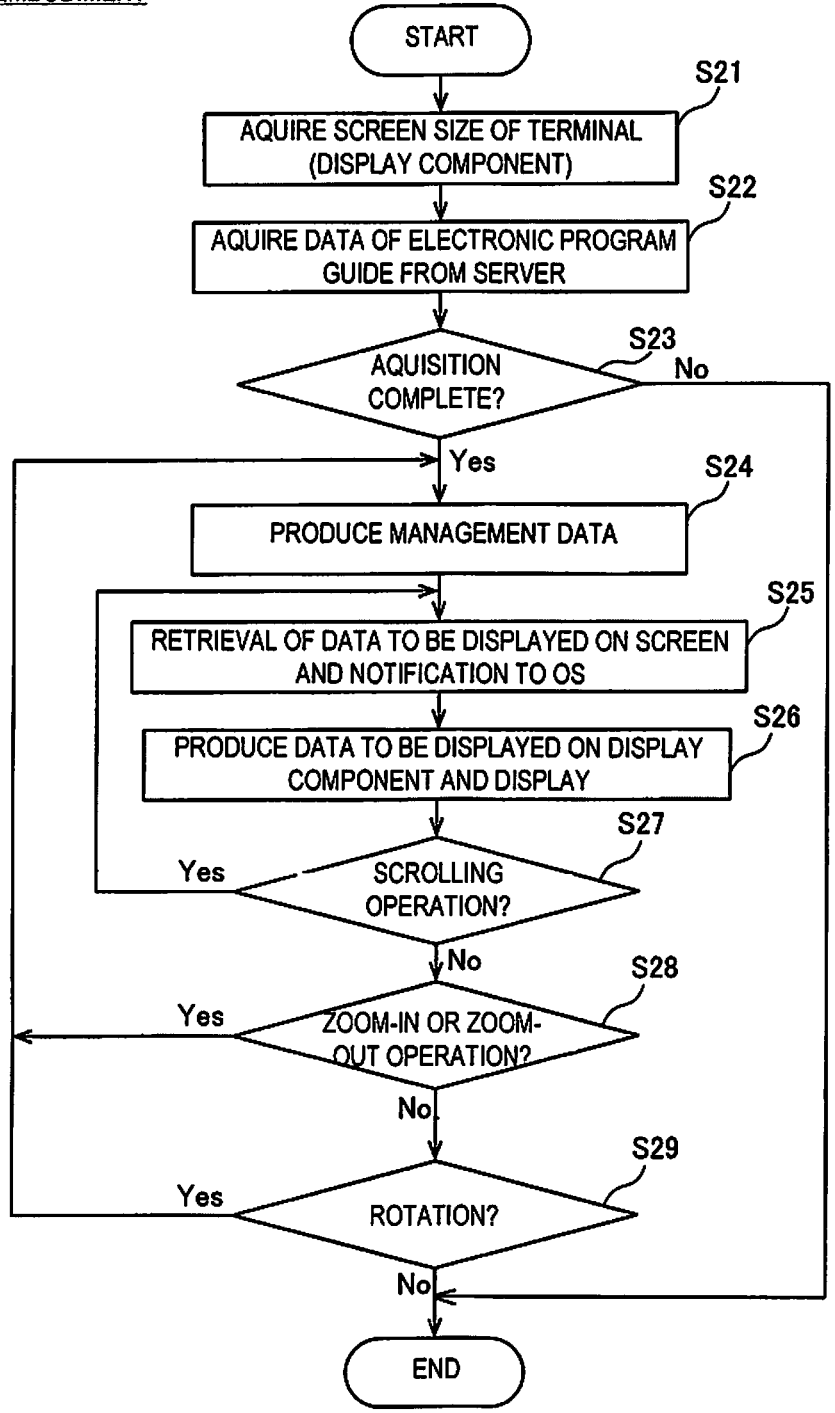
FIG. 12 is a flowchart illustrating a method for displaying the electronic program guide on the display component in the fifth embodiment.

Referring now to FIG. 12, the method for displaying the electronic program guide on the display component 2 by the controller 43 of the display terminal device 500 in the fifth embodiment will now be described.

First, in step S21, the screen size of the display terminal device 500 (display component 2) is acquired. The screen size can be acquired from the OS.

Next, in step S22, the data of the electronic program guide is acquired from the server 101 (via the communication component 1).

Next, in step S23, it is determined whether or not the acquisition of the data of the electronic program guide is complete. If the acquisition of the data has been completed, then the flow proceeds to step S24. If the acquisition of the data is not complete, then the processing is ended. Of course, if the acquisition of the data is not complete, the processing in step S22 can be continued.

Next, in step S24, the management data for each section is produced from the data of the electronic program guide acquired in step S23, the size of the screen of the display component 2, and the orientation of the screen of the display component 2. The management data is managed for each section.

Next, in step S25, the data to be displayed on the screen of the display component 2 is retrieved from the management data of the section that is being operated by the user, and the OS is notified of this. Here, if the display area 2a spans a plurality of sections, then the data to be displayed on the screen of the display component 2 is retrieved from the management data for all of the sections included in the display area 2a. In this case, the OS is also notified of the data of the electronic program guide of the section that is being operated by the user.

Next, in step S26, the data to be displayed on the display component 2 is produced based on the data of which the OS has been notified in step S25, and this data is displayed on the display component 2.

Next, in step S27, it is determined whether or not a scrolling operation has been performed by the user. If a scrolling operation has been performed, then the flow returns to step S25. If no scrolling operation has been performed, then the flow proceeds to step S28.

Next, in step S28, it is determined whether or not the user has performed a zoom-in or zoom-out operation. If a zoom-in or zoom-out operation has been performed, then the flow returns to step S24. If a zoom-in or zoom-out operation has not been performed, then the flow proceeds to step S29.

Next, in step S29, it is determined whether or not the display terminal device 500 (display component 2) is rotated by the user and the orientation of the screen of the display component 2 has changed. If the orientation of the screen of the display component 2 has changed, then the flow returns to step S24. In this case, in step S24 management data is produced based on the aspect ratio of the screen after the orientation change of the screen of the display component 2. If the orientation of the screen of the display component 2 has not changed, then the processing is ended.

The rest of the configuration of the fifth embodiment is the same as in the first embodiment.

Effect of Fifth Embodiment

The following effect can be obtained with the fifth embodiment.

In the fifth embodiment, as described above, the display terminal device 500 is configured such that when the controller 43 divides up the data of the electronic program guide for each of a plurality of sections, the controller 43 determines the size of each of the sections based on the size of the screen of the display component 2 and the orientation of the screen of the display component 2. Consequently, the electronic program guide can be divided up into sizes suited to the size and orientation of the screen of the display component 2, which improves user convenience.

Also, in the fifth embodiment, as described above, the display terminal device 500 is configured such that when the screen of the display component 2 is taller than it is wide, the controller 43 makes each of the plurality of sections taller than it is wide, and when the screen of the display component 2 is wider than it is tall, the controller 43 makes each of the plurality of sections wider than it is tall. Here, when the screen of the display component 2 is taller than it is wide, the user generally scrolls in the vertical direction more often, and when the screen of the display component 2 is wider than it is tall, the user scrolls in the horizontal direction more often. Therefore, if the data of the electronic program guide is divided up for each of a plurality of sections such that when the screen of the display component 2 is taller than it is wide, each of the plurality of sections is taller than it is wide, and when the screen of the display component 2 is wider than it is tall, each of the plurality of sections is wider than it is tall, then it is possible to easily reduce the number of times the data (management data) of the electronic program guide used for processing corresponding to a user operation is switched.

Also, since the sections are wider than they are tall when the screen of the display component 2 is also wider than it is tall, it is possible to easily reduce the likelihood that the display area 2a will span a plurality of sections adjacent in the horizontal direction. Also, since the sections are taller than they are wide when the screen of the display component 2 is taller than it is wide, it is possible to easily reduce the likelihood that the display area 2a will span a plurality of sections adjacent in the vertical direction. This makes it easy to reduce the likelihood that the processing of the controller 43 will slow down.

The other effects of the fifth embodiment are the same as in the first embodiment.

Sixth Embodiment

Figure 13:
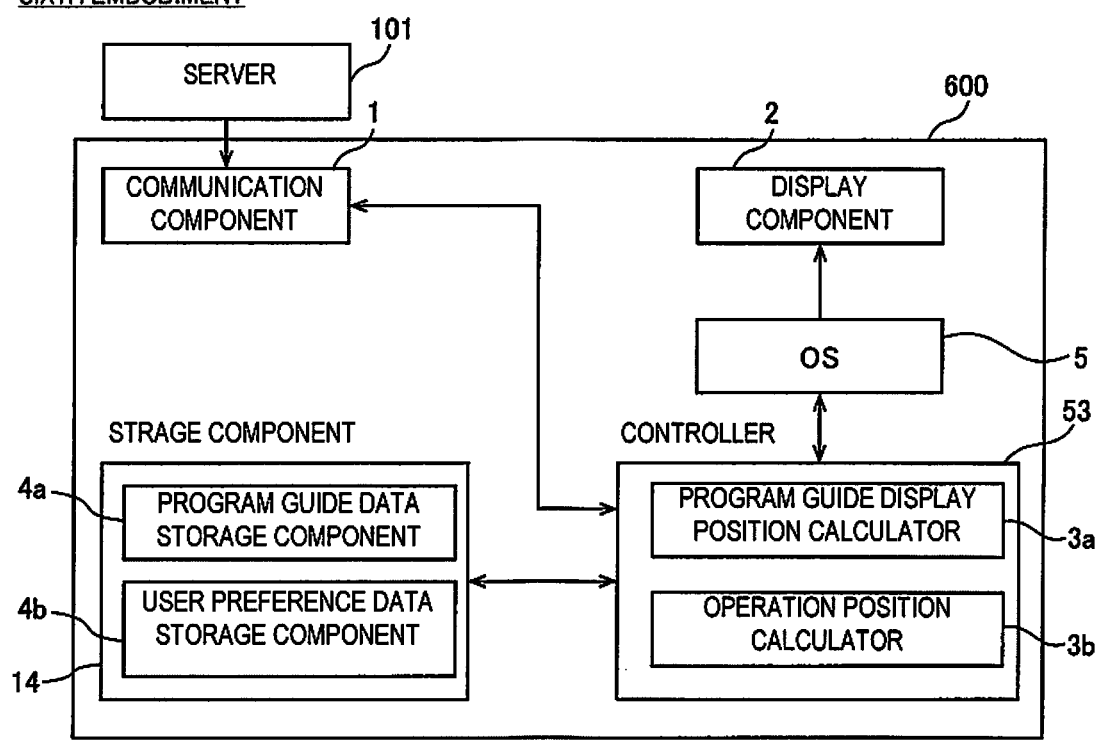
FIG. 13 is a diagram showing the configuration of a program information display terminal device in a sixth embodiment.
Figure 14:
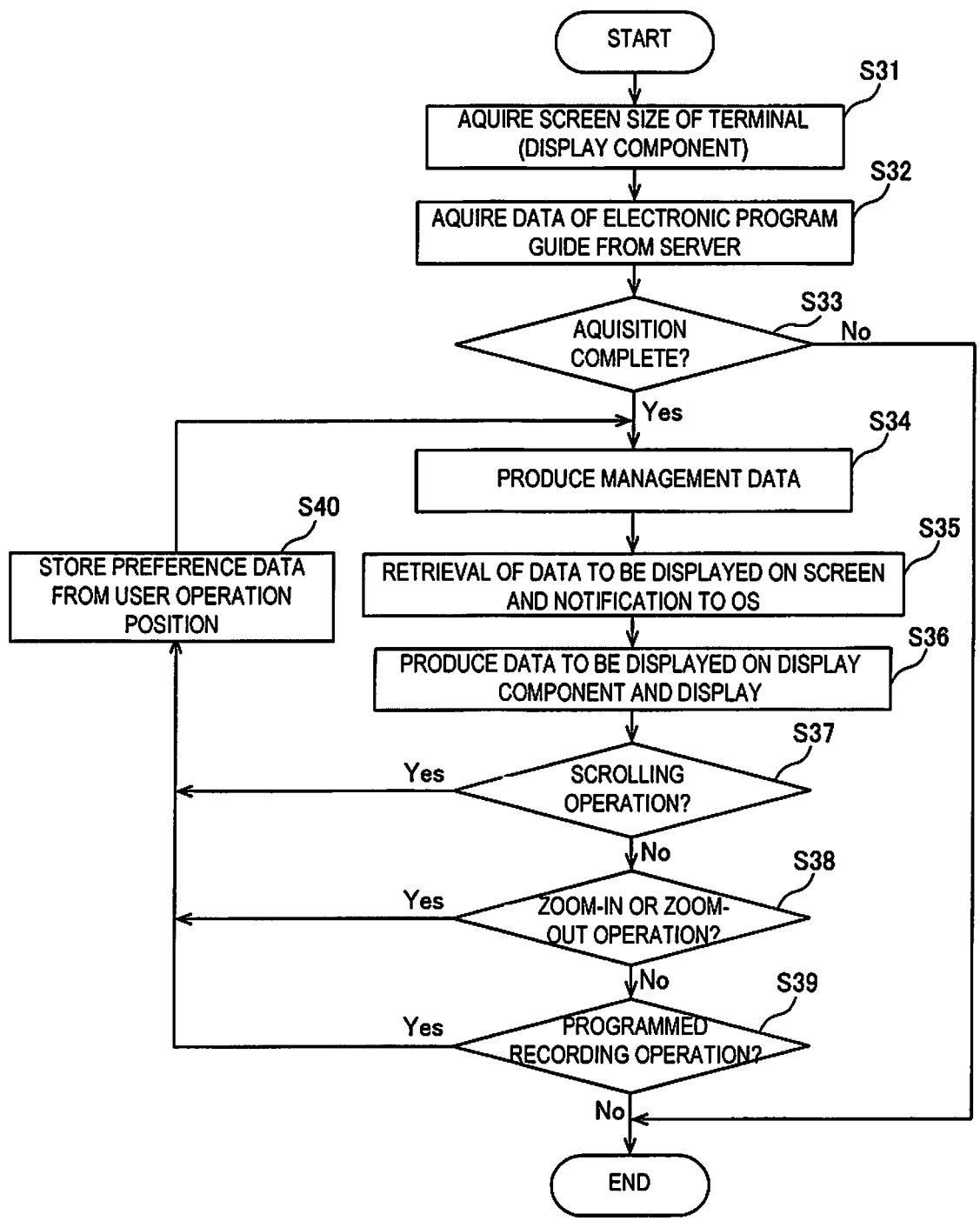
FIG. 14 is a flowchart illustrating a method for displaying the electronic program guide on the display component in the sixth embodiment.

Referring now to FIGS. 13 and 14, the configuration of a display terminal device 600 according to a sixth embodiment will be described. Unlike the first embodiment in which the electronic program guide is divided up into a plurality of sections in the time axis direction, the display terminal device 600 in the sixth embodiment is configured such that the division range of the sections is decided based on the user's personal preferences. Those components that are the same as in the first embodiment will be numbered the same as in the first embodiment and will not be described again. The display terminal device 600 is an example of the "program information display terminal device" of the present application.

Configuration of Display Terminal Device

As shown in FIG. 13, the storage component 14 of the display terminal device 600 further includes a user preference data storage component 4b that collects and store information about user operation positions (e.g., operation position) in the electronic program guide.

Here, in the sixth embodiment, the controller 53 is configured to refer to the operation position information stored in the storage component 14 (the user preference data storage component 4b) and decide the range of each of the sections based on how often the user performs an operation at each position (e.g., operation frequency at each position) in the electronic program guide. For example, let us assume that the user frequently operates CH 4 to CH 8 in the electronic program guide. In this case, the controller 53 does not divide up the sections for the range including CH 4 to CH 8 in the electronic program guide. Let us also assume that the user frequently watches late-night programs. In this case, the controller 53 does not divide the sections at the boundary where the date changes (at 12:00 AM). Operations by the user in this case include scrolling, zooming in or out, programmed recording from the electronic program guide, and the like.

Method for Displaying Electronic Program Guide on Display Component

Referring now to FIG. 14, the method for displaying the electronic program guide on the display component 2 by the controller 53 of the display terminal device 600 in the sixth embodiment will be described.

First, in step S31, the screen size of the display terminal device 600 (display component 2) is acquired. The screen size can be acquired from the OS.

Next, in step S32, the data of the electronic program guide is acquired from the server 101 (via the communication component 1).

Next, in step S33, it is determined whether or not the acquisition of the data of the electronic program guide has been completed. If the acquisition of the data is complete, then the flow proceeds to step S34. If the acquisition of the data is not complete, then the processing is ended. Of course, if the acquisition of the data is not complete, the processing in step S32 can be continued.

Next, in step S34, the management data for each section is produced from the data of the electronic program guide acquired in step S33. The management data is managed for each section. The management data produced first may be the same management data as in the first embodiment, for example.

Next, in step S35, the data to be displayed on the screen of the display component 2 is retrieved from the management data for the section that is being operated by the user, and the OS is notified of this. Here, if the display area 2a spans a plurality of sections, then the data to be displayed on the screen of the display component 2 is retrieved from the management data of all the sections included in the display area 2a. In this case, the OS is also notified of the data of the electronic program guide of the section that is being operated by the user.

Next, in step S36, the data to be displayed on the display component 2 is produced based on the data of which the OS has been notified in step S35, and this data is displayed on the display component 2.

Next, in step S37, it is determined whether or not a scrolling operation has been performed by the user. If a scrolling operation has been performed, then the flow proceeds to step S40. If no scrolling operation has been performed, then the flow proceeds to step S38.

Next, in step S38, it is determined whether or not the user has performed a zoom-in or zoom-out operation. If a zoom-in or zoom-out operation has been performed, then the flow proceeds to step S40. If a zoom-in or zoom-out operation has not been performed, then the flow proceeds to step S39.

Next, in step S39, it is determined whether or not a programmed recording operation has been performed by the user. If a programmed recording operation has been performed, then the flow proceeds to step S40. If no programmed recording operation has been performed, then the processing is ended.

Next, in step S40, information about the user's scrolling position and the position where the zooming was performed, and information about the program reserved for recording are collected and stored in the user preference data storage component 4b, and the flow returns to step S34. In this case, in step S34, the range of each of the sections is decided by referring to the user preference data collected in the user preference data storage component 4b.

The rest of the configuration of the sixth embodiment is the same as in the first embodiment.

Effect of Sixth Embodiment

The following effect can be obtained with the sixth embodiment.

In the sixth embodiment, as described above, the display terminal device 600 further comprises the storage component 14 (user preference data storage component 4b) that collects and stores information about user operation positions in the electronic program guide. The display terminal device 600 is configured such that the controller 53 refers to the information about the operation positions stored in the storage component 14 (the user preference data storage component 4b), and decides the range of each of the sections based on the user operation frequency for each position in the electronic program guide. Consequently, by deciding the range of a plurality of sections so as to correspond to the operation frequency of the user, the program information display terminal device can be made more convenient to use.

The other effects of the sixth embodiment are the same as in the first embodiment.

Modification Examples

The embodiments disclosed herein are merely examples in all respects, and should not be considered as being limiting in nature. The scope of the present invention is indicated not by the description of the above embodiment but by the scope of claims, and encompasses meanings equivalent to the scope of claims and all changes (modifications) within the scope.

For example, in the sixth embodiment, the controller is configured to decide the range of each of the plurality of sections by referring to user preference data collected based on the user operation frequency. However, the present invention is not limited to this. For example, the controller may reduce the size of the section in the time axis direction during a time period in which the number of viewers is estimated to be large, and increase the size of the section in the time axis direction during a time period in which the number of viewers is estimated to be small. A time period in which the number of viewers is estimated to be large and a time period in which the number of viewers is estimated to be small are respective examples of the "first time period" and "second time period" of the present application.

Figure 15:
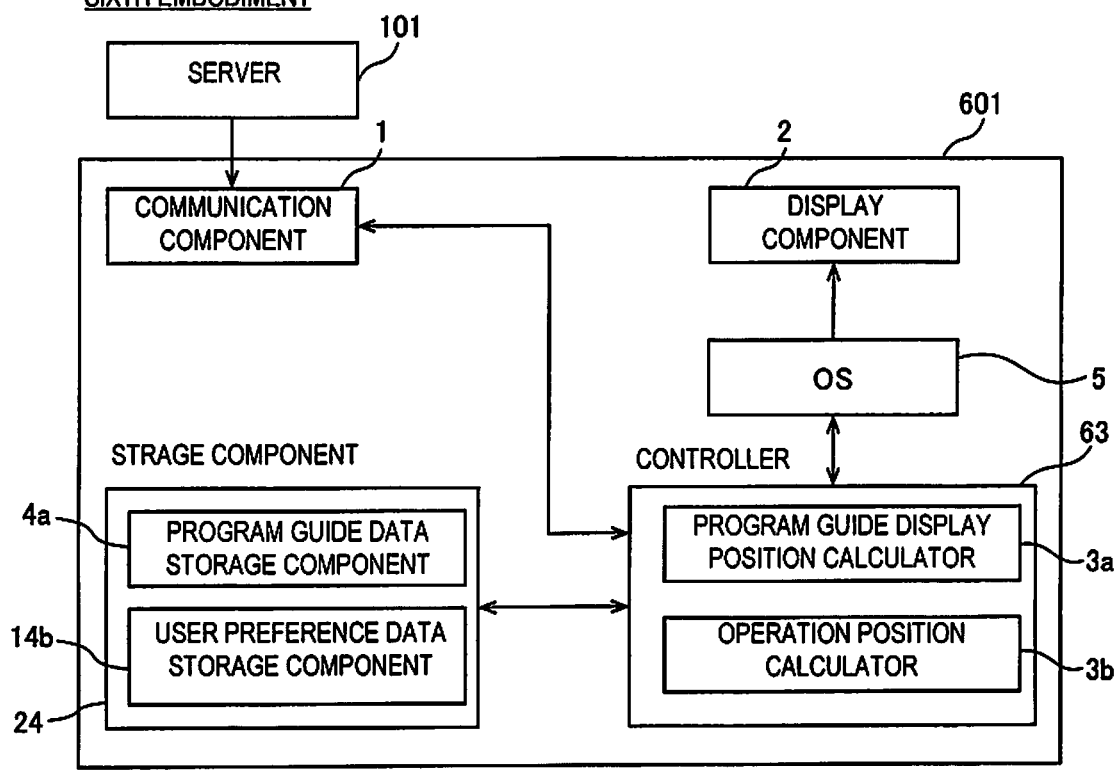
FIG. 15 is a diagram showing the configuration of a program information display terminal device in a modification of the sixth embodiment.

More specifically, as shown in FIG. 15, a storage component 24 of a display terminal device 601 includes a user preference data storage component 14b. The user preference data storage component 14b collects data about personal preferences corresponding to a typical user's viewing habits. More specifically, the user preference data storage component 14b collects, for example, information indicating that the user does not often zoom in or out on the electronic program guide after midnight when the broadcasting of programs has ended, and that the user frequently zooms in or out in the electronic program guide during prime time. Therefore, the controller 63 refers to the data collected in the user preference data storage component 14b, increases the size in the time axis direction of the section after midnight, and decreases the size in the time axis direction of the section in prime time. The display terminal device 601 is an example of the "program information display terminal device" of the present application.

During a time period in which the number of viewers is estimated to be large, the user (viewer) has a relatively high frequency of performing a zooming operation in the electronic program guide. Also, during a time period in which the number of viewers is estimated to be small, the user (viewer) has a relatively low frequency of performing a zooming operation in the electronic program guide. Therefore, by reducing the size of a section in the time axis direction at a position where the frequency of zooming is relatively high in the electronic program guide, it is possible to perform processing corresponding to a user operation by using a relatively small amount of management data in the range that is displayed by being enlarged. That is, it is possible to avoid the use of unnecessary management data when processing is performed by the controller 63.

Also, in the first embodiment, the controller 3 divides up the sections for every full day (for each day) as a unit in the time axis direction. However, the present invention is not limited to this. For example, the controller may perform the division of the sections for every half day as a unit in the time axis direction. Of course, the controller may perform the division of the sections for every predetermined length of time, such as six hours, 8 hours, and the like.

Also, in the second embodiment, the controller 13 performs the division of the sections for every three channels. However, the present invention is not limited to this. For example, the controller may divide up sections for every four channels. Of course, the controller may divide up sections for every predetermined number of channels other than three or four.

Also, in the third embodiment, the controller 23 performs the division of the sections for every full day on the vertical axis (time axis) and for every three channels on the horizontal axis (channel axis). However, the present invention is not limited to this. For example, division of the sections may be performed for every half day on the vertical axis (time axis) and for every four channels on the horizontal axis (channel axis).

In the fourth embodiment, the user's scrolling direction and the direction in which a section extends are parallel. However, the present invention is not limited to this. As long as a section extends along the user's scrolling direction, it does not need to be parallel.

In the first to sixth embodiments, the communication component 1 receives the data of the electronic program guide from the first day to the eighth day for CH 1 to CH 54 from the server 101. However, the present invention is limited to this. For example, the communication component may receive the data of an electronic program guide having relatively few channels, such as an electronic program guide for terrestrial television broadcasting.

In the fourth embodiment, the direction in which the sections extend is changed every time the user scrolling direction changes. However, the present invention is not limited to this. For example, if the user's scrolling direction changes and then scrolling is continued a specific number of times (such as five times) in the new direction, then the direction in which the sections extend may be changed.

In the first to fifth embodiments described above, at least some of the plurality of sections are substantially the same size. However, the present invention is not limited to this. For example, the sizes of all the sections may be different from each other depending on the time zone or channel.

Also, in the first to sixth embodiments, when the range displayed on the display component 2 (the display area 2*a*) spans a plurality of sections, the controller performs processing corresponding to a user operation based on the plurality of sets of management data corresponding to the sections included in the range (the display area 2*a*). However, the present invention is not limited to this. For example, even when the range that is displayed on the display component (the display area 2*a*) spans a plurality of sections, processing corresponding to a user operation may be performed based on just the management data corresponding to the section that is being operated by the user. In this case, the data of the electronic program guide corresponding to the sections that are not being operated by the user is not displayed on the screen.

Also, in the first to sixth embodiments, for the sake of convenience, the processing by the controller is described using a flow driven type of flowchart. However, the present invention is not limited to this. The processing by the controller may instead be event driven, in which it is executed in event units. In this case, the processing may be performed entirely in an event driven manner, or may be a combination of event driven and flow driven.

[1] In view of the state of the known technology and in accordance with an aspect of the present invention, a program information display terminal device comprises a communication component, a display component and a controller. The communication component is configured to receive data of an electronic program guide from an external server. The display component is configured to display the electronic program guide based on the data of the electronic program guide received by the communication component. The controller is configured to divide the data of the electronic program guide for each of a plurality of sections. The controller is configured to perform display control of the electronic program guide by using divided data of the electronic program guide that corresponds to one of the sections including program information that is displayed on the display component.

With this configuration, the controller is configured to perform the display control of the electronic program guide by using the divided data of the electronic program guide that corresponds to the one of the sections including the program information that is displayed on the display component. Thus, the display control of the electronic program guide can be performed using just the divided data of the electronic program guide that corresponds to the one of the sections including the program information that is displayed on the display component. As a result, the amount of data used can be reduced as compared to when processing is performed using all the data of the electronic program guide. Thus, the control load on the controller can be reduced. As a result, processing with respect to user operations in the electronic program guide (such as rendering the electronic program guide) can be faster.

[2] In accordance with a preferred embodiment according to the program information display terminal device mentioned above, the controller is configured to produce and manage management data for each of the sections, the management data including position information indicating a position at which the program information is displayed on the display component and size information indicating a size of a program cell in which the program information is displayed. With this configuration, the program information can be searched and displayed using just the management data corresponding to a portion of a plurality of sets of management data provided for the sections, respectively. Thus, the search and display of the program information can be performed faster than when using a single set of management data corresponding to the entire electronic program guide.

[3] In accordance with a preferred embodiment according to any one of the program information display terminal devices mentioned above, the controller is configured to perform the display control of the electronic program guide by using the management data that corresponds to the one of the sections including the program information that is displayed on the display component. With this configuration, the processing can be performed using only the management data corresponding to the section including the program information that is displayed on the display component. Thus, the processing can be performed without using unnecessary management data corresponding to sections other than the section including the program information that is displayed on the display component. As a result, processing to retrieve the program information from the management data based on user operations can be performed easily and quickly.

[4] In accordance with a preferred embodiment according to any one of the program information display terminal devices mentioned above, when a range of the electronic program guide that is displayed by the display component spans at least two of the sections, the controller is configured to perform the display control of the electronic program guide based on a plurality of sets of the management data that correspond to the at least two of the sections within the range. With this configuration, the processing can be performed using not only the management data corresponding to the section operated by the user, but also the management data corresponding to all sections within the above-mentioned range. As a result, even when the range of the electronic program guide that is displayed by the display component spans a plurality of sections, appropriate program information can still be displayed on the display component.

[5] In accordance with a preferred embodiment according to any one of the program information display terminal devices mentioned above, when the one of the sections including the program information displayed on the display component is switched to a different one of the sections by scrolling, the controller is configured to perform the display control of the electronic program guide based on the management data that corresponds to the different one of the sections. With this configuration, even after the section including the program information displayed on the display component is switched, the processing can be performed using the appropriate management data.

[6] In accordance with a preferred embodiment according to any one of the program information display terminal devices mentioned above, the controller is configured to produce and manage the management data for each of the sections that are formed by dividing the electronic program guide in a time axis direction of the electronic program guide. With this configuration, when the amount of data in the time axis direction is large, the amount of management data corresponding to each section can easily be reduced. As a result, when the amount of data in the time axis direction is large, it is easy to increase the speed of processing corresponding to user operations in the electronic program guide.

Also, dividing up the electronic program guide in the time axis direction makes it less like that the range displayed on the display component will span a plurality of sections in an axial direction perpendicular to the time axis direction. Consequently, even when processing is performed using all of the management data corresponding to a plurality of sections within the above-mentioned range when the range extends over the plurality of sections, the processing by the controller will be less likely to slow down. That is, dividing up the electronic program guide in the time axis direction is particularly effective when scrolling in the axial direction perpendicular to the time axis direction.

[7] In accordance with a preferred embodiment according to any one of the program information display terminal devices mentioned above, the controller is configured to produce and manage the management data for each of the sections that are formed by dividing the electronic program guide in a channel axis direction of the electronic program guide. With this configuration, when there are a large number of channels in the electronic program guide and the amount of data in the channel axis direction is large, the amount of management data corresponding to each section can easily be reduced. As a result, when the amount of data in the channel axis direction is large, it is easy to speed up the processing corresponding to user operations in the electronic program guide.

Also, it is less likely that the range displayed on the display component will span a plurality of sections in an axial direction perpendicular to the channel axis direction. Consequently, even when processing is performed using all of the management data corresponding to a plurality of sections within the above-mentioned range when the range spans the plurality of sections, it is less likely that the processing of the controller will slow down. That is, dividing up the electronic program guide in the channel axis direction is particularly effective when scrolling in the axial direction perpendicular to the channel axis direction.

[8] In accordance with a preferred embodiment according to any one of the program information display terminal devices mentioned above, the controller is configured to produce and manage management data for each of the sections that are formed by dividing the electronic program guide in a time axis direction of the electronic program guide and in a channel axis direction of the electronic program guide. With this configuration, when the amount of data in both the time axis direction and the channel axis direction is large, the amount of management data corresponding to each section can be effectively reduced. As a result, when the amount of data in both the time axis direction and the channel axis direction is large, it is possible to effectively speed up the processing corresponding to user operations in the electronic program guide.

Also, since the amount of data of the management data for each section is relatively small, when the range displayed on the display component spans a plurality of sections, it is less likely that the processing of the controller will slow down even when the processing is performed using all of the management data corresponding to the plurality of sections within the above-mentioned range. That is, dividing up the electronic program guide in both the time axis direction and the channel axis direction is particularly effective when scrolling in an oblique direction intersecting the time axis direction and the channel axis direction.

[9] In accordance with a preferred embodiment according to any one of the program information display terminal devices mentioned above, the controller is configured to divide the data of the electronic program guide for each of the sections such that each of the sections extends along a scrolling direction. With this configuration, it is less likely that the number of sections operated (passed through) by user scrolling will increase than when each of the sections extends along a direction different from the scrolling direction. Thus, it is possible to reduce the number of times that the data of the electronic program guide used for processing corresponding to the user operations is switched. As a result, the control load on the controller can be reduced, and it is less likely that the processing of the controller will slow down.

Also, since each of the sections extends along the scrolling direction, it is possible to effectively suppress the range displayed on the display component from spanning a plurality of sections. Consequently, even when processing is performed using all of the management data corresponding to the plurality of sections within the above-mentioned range when the range spans the plurality of sections, the processing by the controller is less likely to slow down.

[10] In accordance with a preferred embodiment according to any one of the program information display terminal devices mentioned above, the controller is configured to change a direction in which each of the sections extends in response to the scrolling direction changing. With this configuration, it is possible to more reliably reduce the number of times the data of the electronic program guide used for processing corresponding to user operations is switched.

Also, compared to when the direction in which the sections are divided is fixed, it is even less likely that the range displayed on the display component will span a plurality of sections. Consequently, even if processing is performed using all of the management data corresponding to the plurality of sections within this range when the range spans the plurality of sections, the processing by the controller will be even less likely to slow down.

[11] In accordance with a preferred embodiment according to any one of the program information display terminal devices mentioned above, when the data of the electronic program guide is divided for each of the sections, the controller is configured to determine a size of each of the sections based on a size and an orientation of a screen of the display component. With this configuration, the electronic program guide can be divided up into sizes suited to the size and the orientation of the screen of the display component. This improves user convenience.

[12] In accordance with a preferred embodiment according to any one of the program information display terminal devices mentioned above, the controller is configured to divide the data of the electronic program guide for each of the sections such that when the screen of the display component is taller than it is wide, each of the sections is taller than it is wide, and when the screen of the display component is wider than it is tall, each of the sections is wider than it is tall. Here, in general, when the screen of the display component is taller than it is wide, the user scrolls in the vertical direction more frequently, and when the screen of the display component is wider than it is tall, the user scrolls in the horizontal direction more frequently. Therefore, the data of the electronic program guide is divided for each of the sections such that when the screen of the display component is taller than it is wide, each of the sections is taller than it is wide, and when the screen of the display component is wider than it is tall, each of the each of the plurality of sections is wider than it is tall. This makes it easy to reduce the number of times the data of the electronic program guide used for processing corresponding to the user operations is switched.

Also, since the sections are divided up so as to be wider than they are tall when the screen of the display component is wider than it is tall, the range displayed on the display component can be easily kept from spanning a plurality of sections adjacent in the horizontal direction. Also, since the sections are divided up so as to be taller than they are wide when the screen of the display component is taller than it is wide, the range displayed on the display component can be easily kept from spanning a plurality of sections adjacent in the vertical direction. Consequently, even when processing is performed using all of the management data corresponding to a plurality of sections within the range when the range spans the plurality of sections, the processing of the controller can be easily kept from slowing down.

[13] In accordance with a preferred embodiment according to any one of the program information display terminal devices mentioned above, the controller is configured to change an aspect ratio of the sections in response to the orientation of the screen of the display component changing.

[14] In accordance with a preferred embodiment according to any one of the program information display terminal devices mentioned above, the program information display terminal device further comprises a storage component. The storage component is configured to store information about an operation position in the electronic program guide. The controller is configured to refer to the information about the operation position stored in the storage component and configured to decide a range of each of the sections based on an operation frequency at each position in the electronic program guide. With this configuration, deciding the range of the sections so as to correspond to the operation frequency makes the program information display terminal device even more convenient to use.

[15] In accordance with a preferred embodiment according to any one of the program information display terminal devices mentioned above, the controller is configured to divide the electronic program guide into the sections such that at least some of the sections are substantially equal in size. With this configuration, the control load on the controller can be reduced as compared to when the size is set for each section.

[16] In accordance with a preferred embodiment according to any one of the program information display terminal devices mentioned above, the controller is configured to reduce a size of the sections in a time axis direction of the electronic program guide in a first time period of the electronic program guide and configured to increase the size of the sections in the time axis direction in a second time period of the electronic program guide. Here, in a time period in which it is estimated that the number of viewers will be large, the frequency at which the user (viewer) performs a zoom-in operation in the electronic program guide is relatively high. Also, in a time period in which it is estimated that the number of viewers will be small, the frequency at which the user (viewer) performs a zoom-in operation in the electronic program guide is relatively low. Therefore, by decreasing the size of a section in the time axis direction in the first time period and increasing the size of the section in the time axis direction in the second time period, the size of the section in the time axis direction can be reduced at a position where the frequency at which a zoom-in operation is performed in the electronic program guide is relatively high. Consequently, processing corresponding to the user operations can be performed using a relatively small amount of management data in a range that is displayed by being enlarged. That is, it is possible to suppress the use of unnecessary management data when processing is performed by the controller.

[17] In accordance with a preferred embodiment according to any one of the program information display terminal devices mentioned above, the display control of the electronic program guide by the controller includes display control for scrolling and zooming in the electronic program guide. With this configuration, in the electronic program guide, it is possible to speed up the rendering of the electronic program guide in response to scrolling and zooming in or out performed by the user.

[18] In accordance with a preferred embodiment according to any one of the program information display terminal devices mentioned above, the controller is configured to update the management data in response to the controller performing the display control of the electronic program guide.

[19] In accordance with a preferred embodiment according to any one of the program information display terminal devices mentioned above, the controller is configured to update the management data in response to the controller performing zooming operation of the electronic program guide.

[20] In accordance with a preferred embodiment according to any one of the program information display terminal devices mentioned above, the controller is configured to perform the display control of the electronic program guide by using only part of the electronic program guide that corresponds to the one of the sections.

With the present invention, as described above, it is possible to speed up processing in response to the user operations in an electronic program guide.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A program information display terminal device comprising:
    a communication component that receives data of an electronic program guide from an external server, the electronic program guide being a table that lists program information of programs in a time axis direction and in a channel axis direction;
    a display component that displays a table area within the electronic program guide on a screen of the display component based on the data of the electronic program guide received by the communication component, the table area listing program information of a selected part of the programs in the time axis direction and in the channel axis direction; and
    a controller that divides the data of the electronic program guide into a plurality of sets of divided data that corresponds to a plurality of divided areas of the electronic program guide, respectively,
    the controller performing display control of the table area to scroll the table area within the electronic program guide by using a set of the divided data of the electronic program guide that corresponds to one of the divided areas in which the table area is currently located while the table area scrolls within the one of the divided areas,
    the controller performing the display control of the table area by using a different set of the divided data of the electronic program guide that corresponds to a different one of the divided areas when a divided area in which the table area is currently located is switched from the one of the divided areas to the different one of the divided areas by scrolling, and
    an entirety of the table area within the electronic program guide being simultaneously displayed on the screen, and the entirety of the table area within the electronic program guide being smaller than the divided areas of the electronic program guide in the time axis direction of the electronic program guide and in the channel axis direction of the electronic program guide.

2. The program information display terminal device according to claim 1, wherein
    the controller produces and manages management data for each of the divided areas, the management data including position information indicating a position at which the program information is displayed on the display component and size information indicating a size of a program cell in which the program information is displayed.

3. The program information display terminal device according to claim 2, wherein
    the controller performs the display control of the table area by using the management data that corresponds to the one of the divided areas in which the table area is currently located.

4. The program information display terminal device according to claim 2, wherein
    when the table area of the electronic program guide that is simultaneously displayed on the screen spans at least two of the divided areas, the controller performs the display control of the table area based on a plurality of sets of the management data that correspond to the at least two of the divided areas.

5. The program information display terminal device according to claim 2, wherein
    when the one of the divided areas is switched to the different one of the divided areas by scrolling, the controller performs the display control of the table area based on the management data that corresponds to the different one of the divided areas.

6. The program information display terminal device according to claim 2, wherein
    the controller produces and manages the management data for each of the divided areas that are formed by dividing the electronic program guide in the time axis direction of the electronic program guide.

7. The program information display terminal device according to claim 2, wherein
    the controller produces and manages the management data for each of the divided areas that are formed by dividing the electronic program guide in the channel axis direction of the electronic program guide.

8. The program information display terminal device according to claim 2, wherein
    the controller produces and manages the management data for each of the divided areas that are formed by dividing the electronic program guide in the time axis direction of the electronic program guide and in the channel axis direction of the electronic program guide.

9. The program information display terminal device according to claim 1, wherein
the controller divides the data of the electronic program guide for each of the divided areas such that each of the divided areas extends along a scrolling direction.

10. The program information display terminal device according to claim 9, wherein
the controller changes a direction in which each of the divided areas extends in response to the scrolling direction changing.

11. The program information display terminal device according to claim 1, wherein
when the data of the electronic program guide is divided for each of the divided areas, the controller determines a size of each of the divided areas based on a size and an orientation of the screen of the display component.

12. The program information display terminal device according to claim 11, wherein
the controller divides the data of the electronic program guide for each of the divided areas such that when the screen of the display component is taller than it is wide, each of the divided areas is taller than it is wide, and when the screen of the display component is wider than it is tall, each of the divided areas is wider than it is tall.

13. The program information display terminal device according to claim 11, wherein
the controller changes an aspect ratio of the divided areas in response to the orientation of the screen of the display component changing.

14. The program information display terminal device according to claim 1, further comprising
a storage component that stores information about an operation position in the electronic program guide,
the controller referring to the information about the operation position stored in the storage component and deciding each of the divided areas based on an operation frequency at each position in the electronic program guide.

15. The program information display terminal device according to claim 1, wherein
the controller divides the electronic program guide into the divided areas such that at least some of the divided areas are substantially equal in size.

16. The program information display terminal device according to claim 1, wherein
the controller reduces a size of the divided areas in the time axis direction of the electronic program guide in a first time period of the electronic program guide and increases the size of the divided areas in the time axis direction in a second time period of the electronic program guide.

17. The program information display terminal device according to claim 1, wherein
the display control of the table area by the controller includes display control for scrolling and zooming in the electronic program guide.

18. The program information display terminal device according to claim 2, wherein
the controller updates the management data in response to the controller performing the display control of the table area.

19. The program information display terminal device according to claim 18, wherein
the controller updates the management data in response to the controller performing zooming operation of the electronic program guide.

20. The program information display terminal device according to claim 1, wherein
the controller performs the display control of the table area by using only the set of the divided data of the electronic program guide that corresponds to the one of the divided areas while the table area scrolls within the one of the divided areas.

* * * * *